United States Patent [19]
Laurent

[11] 3,821,497
[45] June 28, 1974

[54] POLYPHASE COLLECTOR HEAD ASSEMBLY HAVING INNER PARTITION WALLS

[75] Inventor: Daniel Laurent, Grenoble, France

[73] Assignee: Societe Dauphinoise Electrique, Grenoble, France

[22] Filed: Mar. 14, 1973

[21] Appl. No.: 341,292

[30] Foreign Application Priority Data
Mar. 15, 1972 France .............................. 72.9747

[52] U.S. Cl. ........................ 191/57, 191/48, 191/49
[51] Int. Cl. ............................................... B60l 5/36
[58] Field of Search ............ 191/45, 47, 48, 49, 50, 191/57, 58, 59, 59.1, 60, 60.1, 60.5, 64, 65, 66, 72, 73, 74, 75

[56] References Cited
UNITED STATES PATENTS
2,696,533   12/1954   Hammerly ............................ 191/48

Primary Examiner—M. Henson Wood, Jr.
Assistant Examiner—D. W. Keen
Attorney, Agent, or Firm—Stevens, Davis, Miller & Mosher

[57] ABSTRACT

A polyphase collector head having a plurality of longitudinal rows of contact shoes resiliently biased into sliding contact engagement with a corresponding plurality of current distribution rails. The collector head is pivotally supported by a transverse support arm. The collector head and the support arm are hollow and comprise inner partition walls defining a plurality of compartments insulated from each other to accommodate electric connections to the contact shoes.

5 Claims, 3 Drawing Figures

Fig: 2

POLYPHASE COLLECTOR HEAD ASSEMBLY HAVING INNER PARTITION WALLS

This invention relates to polyphase collector head assemblies and relates more particularly to a collector head assembly adapted to collect current from a plurality of phase conductors in order to supply a vehicle running along the phase conductors and which supports the collector head assembly in driving connection therewith.

Reference may be had to the French Patent Application No. 71.17071, filed on May 11, 1971, for the description of a collector head and current distribution system for use with high speed vehicles such as air cushion supported trains. The current distribution system is comprised of a plurality of parallel phase conductor rails which are spaced apart, preferably as the apices of a regular polygon, to define a passageway therebetween for the collector head. The phase rails comprise each a longitudinally extending contact surface directed towards the center of the polyhedron and the collector head is equipped with a corresponding number of longitudinal rows of sliding contact shoes, one row for each rail, matching with the rails so that the contact shoes may collect current from the rails against which they are resiliently biased in order to supply current to the vehicle. The latter, which is guided by a trackway parallelly to the phase conductor rails, carries a support arm which extends transversely of the phase conductors and penetrates between a pair of adjacent phase conductors to support and drive the collector head. The support arm accomodates the electric connections between the contact shoes and the vehicle and is preferably pivotally connected by ball-and socket means to the center of the collector head so as to permit universal pivotal movement of the collector head, which is guided by the phase conductors, and to avoid jamming of the collector head against the phase conductors.

High speed collector heads call for a light-weight streamlined compact construction to diminish drag and inertia forces. On the other hand, dielectric considerations oppose to the requirement for compactness.

It is an object of the invention to provide a collector head assembly of reliable, highly compact construction of high dielectric strength in which the insulating means permit free pivotal movement of the collector head relative to the support arm and in which the electric connections are readily accessible and easy to mount and demount.

Generally, the collector head assembly according to the invention comprises longitudinally extending partition walls in the hollow support arm and further inner partition walls in the collector head to define a plurality of insulating compartments for the electric connections between the vehicle and the contact shoes so as to eliminate the danger of flashover between adjacent phases. According to a further aspect of the invention, the compartments of the support arm and the corresponding compartments of the collector head engage each other by plug-in end portions providing for free relative pivotal movements of the collector head with respect to the support arm.

These and other objects, features and advantages of the invention will become apparent upon reading the following specification which describes an illustrative embodiment of the invention shown in the accompanying drawings of which:

Figure 1:
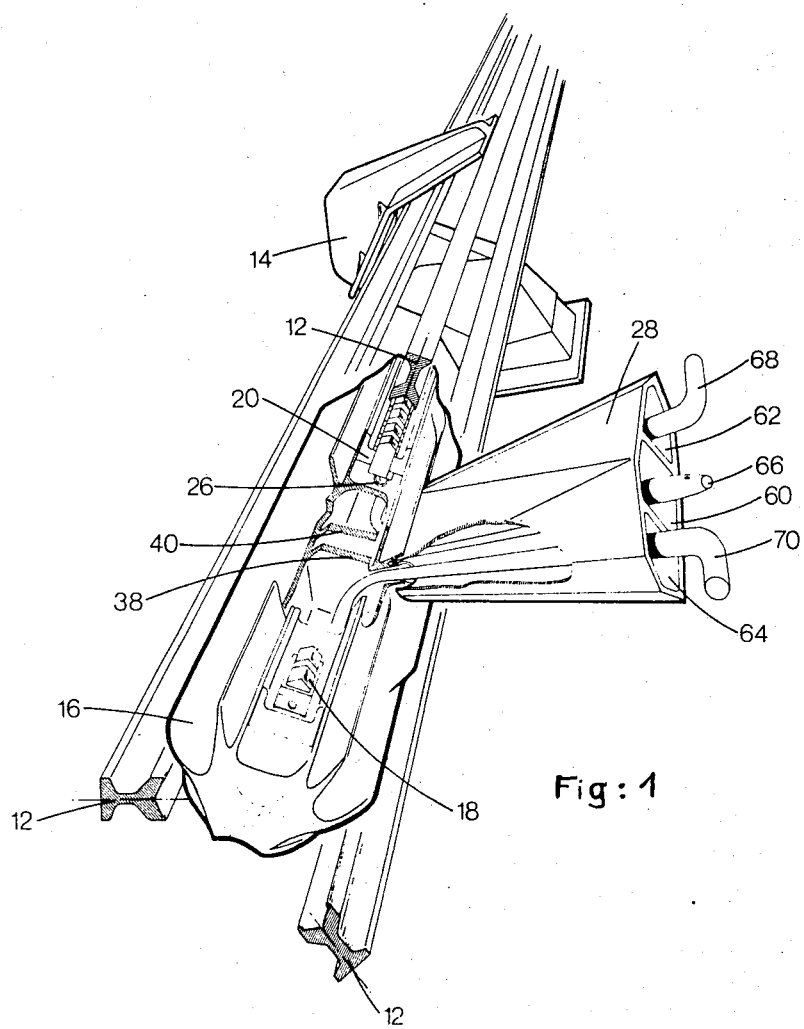
FIG. 1 is a schematic perspective view of the embodiment, certain parts being broken away for a better understanding of the specification.
Figure 2:
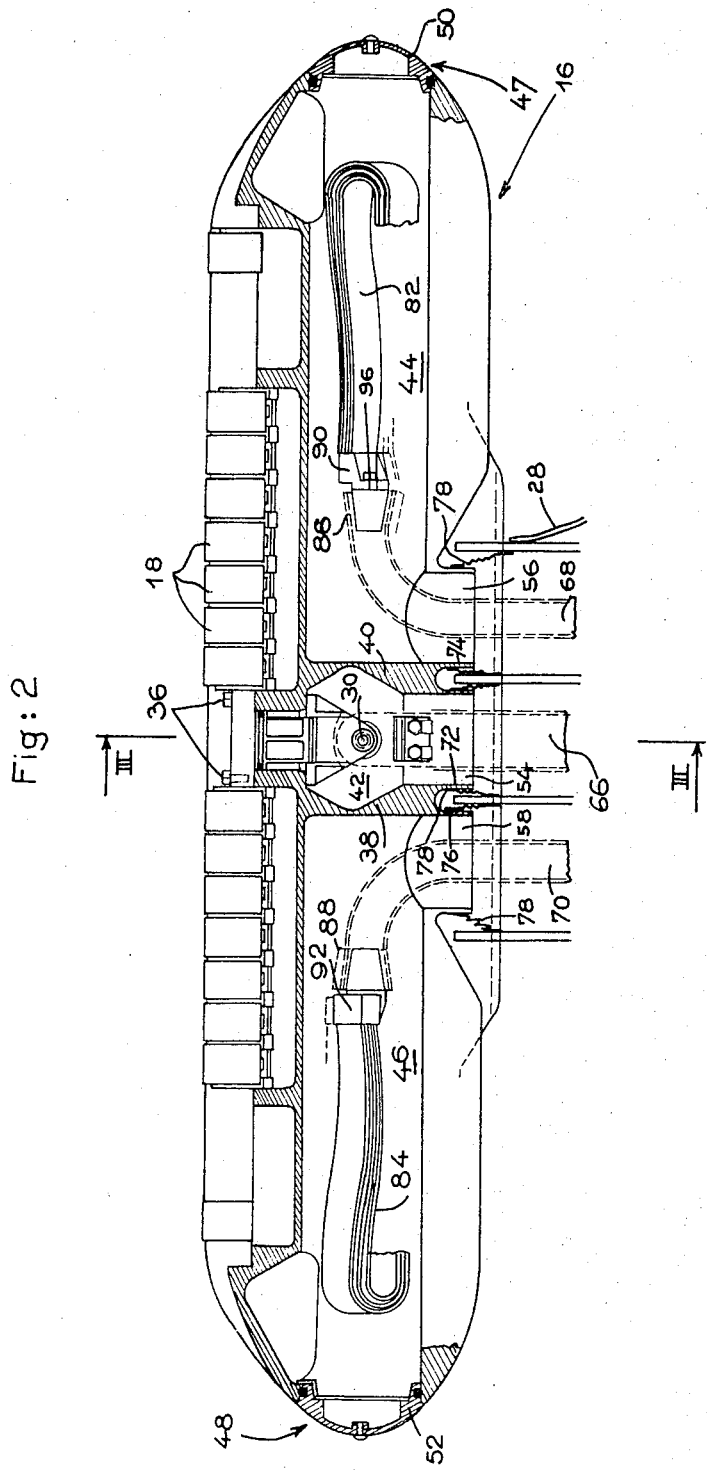
FIG. 2 is a partial section at an enlarged scale taken along lines II—II of FIG. 3.

In the FIGURES, a threephase current distribution system, generally designated by the numeral 10, comprises three parallel equidistant phase conductor rails 12 arranged in a known manner according to the apices of a equilateral triangle. The rails 12 are supported by transverse, generally C-shaped insulating brackets 14 which are regularly spaced apart along the phase conductors. The rails define thus a passageway in which an elongated collector head 16 may translate to collect current from the rails. The collector head carries three longitudinal rows of contact shoes 18 shaped and disposed for sliding contact engagement with the three phase conductor rails 12. The contact shoes 18 of the rows are guided on longitudinal support members 20, 22 and 24, respectively, which extend along with the rows for a major part of the length of the collector head. The contact shoes are guided, in a well-known manner which is therefore not shown in detail, for radial movement on the collector head and resilient members, such as springs schematically indicated at 26, urge the contact shoes into engagement with the respective rails. The support members 20, 22 and 24, which are of conducting material, insure also the electric connection with the contact shoes, for example by braids (not shown). The collector head is connected to a vehicle (not shown) by a support arm 28 which may constitute a part of a parallel motion support system as shown in the above mentioned Patent Application. The central part of the collector head is pivotally mounted, preferably by ball-and-socket 28 or other universal joint means, on the free end of the support arm 28 which is streamlined as an air foil to reduce the aerodynamic resistance at higher speeds.

Figure 3:
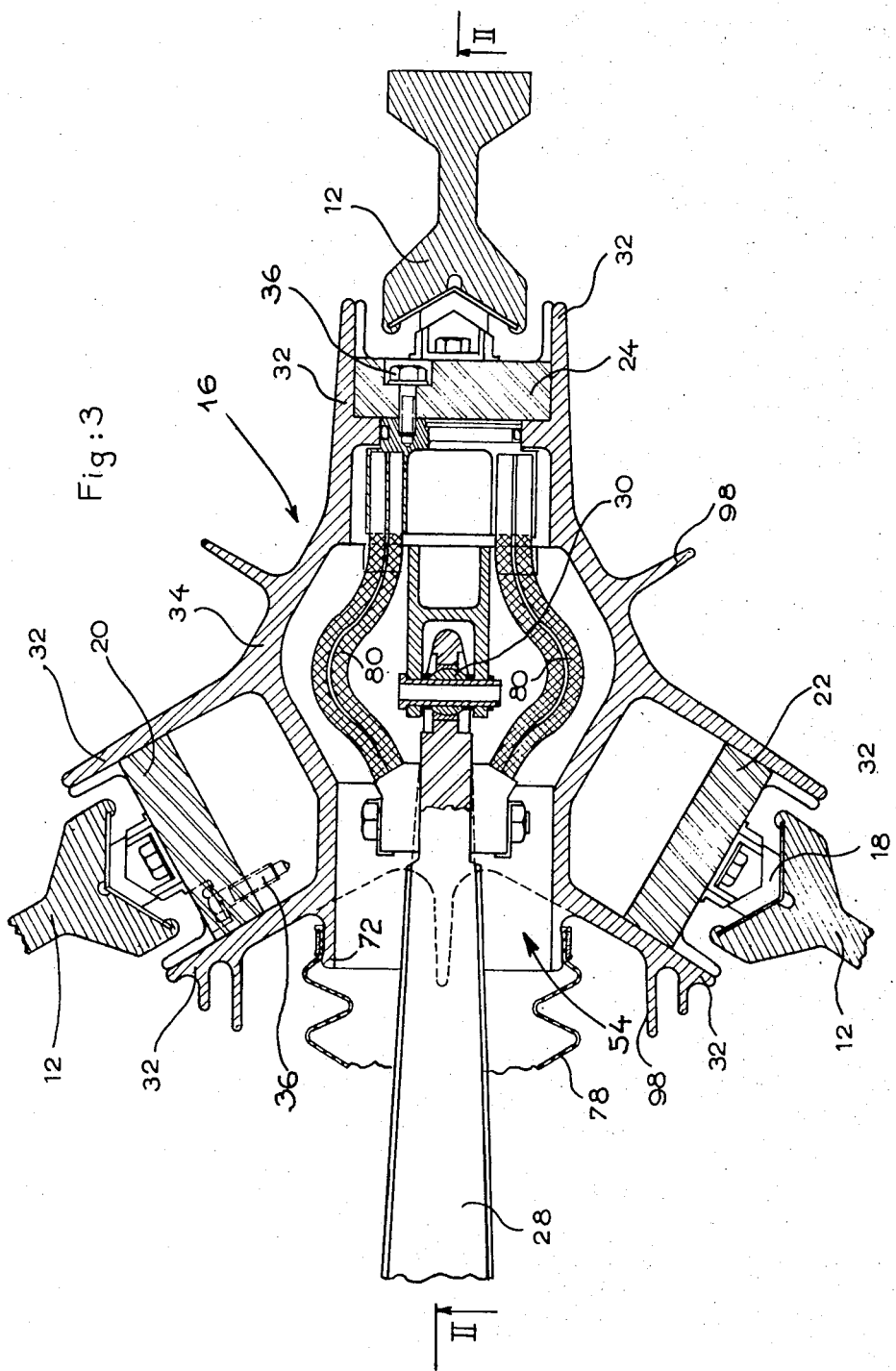
FIG. 3 is a section on the reduced scale taken along lines III—III of FIG. 2, the phase conductor rails being not shown.

In the embodiment shown, the collector head comprises a moulded unitary support structure of insulating material. The support structure defines three pairs of outwardly extending side flanges 32 joined by a common core or web portion 34 to accomodate the longitudinal support members 20, 22 and 24 which are bolted thereto, as shown at 36. The tubular structure 16 defines an inner cavity which is divided into three longitudinally aligned compartments 46, 42 and 44 by transverse partition walls 38 and 40. Removable caps 50, 52 close the end portions 47 and 48, respectively, of the collector head 16 and make the end compartments 44 and 46 readily accessible. The compartments 42, 44 and 46 define each a lateral orifice 54, 56, 58, respectively, facing the support arm 28. The inner cavity of the latter if divided by longitudinally extending partition walls to define three juxtaposed compartments 60, 62, 64 extending longitudinally of the support arm 28 to accomodate phase conductors 66, 68, 70, respectively, connecting the three rows of contact shoes to the vehicle. The lateral spacing of the tubular compartments 60, 62, 64 corresponds to the spacing of the orifices 54, 56, 58 and the latter are bordered by collars 72, 74, 76, respectively, which engage with clearance into the corresponding compartments 60, 62, 64. Bellow members 78 connecting the collars 72, 74, 76 with the wall portions of the corresponding compartments 60, 62, 64 induce the continuity of the partitioning between the support arm and th collector head without interfering with the possibility for the collector head to perform limited pivotal movements with respect to the support arm. The electric conductors 66, 68, 70 penetrate through the orifices 54, 56, 58 into the compartments 42, 44, 46, respectively, each compartment being associated with a phase of the supply system. The conductor 66, after having traversed the central compartment 42 which also accomodates the universal joint 30, is connected to the central part of the support member 24 by means of braids 80 which do not impede the relative movement of the collector head and the support arm. The conductors 68 and 70 are bend at right angles and have each an end portion 88 defining a truncated conical recess which extends axially of the compartments 44, 46, respectively, to receive a corresponding terminal 90, 93, respectively, defining a truncated conical projection of braids 82, 84, respectively. The terminals 88 and 90, 92 are assembly by means of axial bolts 96 which can easily be fastened after withdrawal of the caps 50, 52 whereby the conical fitting permits to obtain an excellent contact pressure. The opposed ends of the braids 82, 84, which extend substantially axially in the compartments 44, 46, are connected to the outermost end portions, adjacent the respective end portions 47, 48 of the collector head, of the support members 20, 22, respectively. The latter connections may be of the same type as the connections of the terminals 88 to 90, 92. The collector head may comprise radially and longitudinally extending ribs or fins 98 (FIG. 3) to increase the creeping or leakage path between adjacent phases.

It is to be noted that the phase leads are entirely insulated from each other by partition walls precluding flash-over. The phase leads are rigid at the plug-in transition zones between the collector head and the support arm and the flexible parts are carried forward into the perfectly protected inner compartments of the collector head.

What is claimed is:

1. Polyphase collector head assembly for use with a plurality of spaced parallel phase conductor rails, comprising an elongated hollow support arm carrying a plurality of peripheral rows of longitudinally aligned contact shoes adapted for sliding contact with said rails under the action of resilient bias means urging said contact shoes away from said support member, and a hollow support arm extending transversely of said support member adapted to connect said collector head to a vehicle guided parallelly to said rails, said support arm being pivotally connected to said support member, said support member and said support arm comprising a plurality of inner partition walls defining a plurality of compartments, one for each of said rows, which are insulated from each other to accomodate a corresponding plurality of electrical conductors connected to said contact shoes of said rows, respectively, and running through said support arm for connection to said vehicle, the compartments of said support member and of said support arm being adapted for plug-in engagement with each other in such a manner as to permit pivoting movements of said support member relative to said support arm.

2. A collector head assembly according to claim 1, said support member and the inner partition walls thereof being comprised of a unitary molded structure of insulating material.

3. A three-phase collector head assembly according to claim 1, comprising three equidistant rows of contact shoes, the inner partition walls of said support member comprising a pair of transverse partition walls defining three longitudinally aligned compartments within said support member.

4. A three-phase collector head assembly according to claim 3, the inner partition walls of said support arm comprising a pair of partition walls extending longitudinally of said support arm to define three longitudinal compartments therein registering at the plug-in ends thereof with the plug-in ends of the three compartments of said support member.

5. A three-phase collector head assembly according to claim 4, said support member being shaped in such a manner that the central compartment thereof accomodate a pivotal connection between said support arm and said support member, the other compartments extending substantially unto the longitudinal ends of said support member, respectively, said support member comprising a pair of removable caps at said ends, respectively, to permit ready access to said electrical conductors.

* * * * *